United States Patent
Flohr et al.

(10) Patent No.: US 9,982,633 B2
(45) Date of Patent: May 29, 2018

(54) METHOD AND DEVICE FOR OPERATING A GAS INTERNAL COMBUSTION ENGINE

(71) Applicant: MTU Friedrichshafen GmbH, Friedrichshafen (DE)

(72) Inventors: Andreas Flohr, Manzell (DE); Andreas Geller, Ulm (DE)

(73) Assignee: MTU FRIEDRICHSHAFEN GMBH, Friedrichshafen (DE)

(*) Notice: Subject to any disclaimer, the term of this patent is extended or adjusted under 35 U.S.C. 154(b) by 30 days.

(21) Appl. No.: 14/780,912

(22) PCT Filed: Jan. 20, 2014

(86) PCT No.: PCT/EP2014/000142
§ 371 (c)(1),
(2) Date: Sep. 28, 2015

(87) PCT Pub. No.: WO2014/154314
PCT Pub. Date: Oct. 2, 2014

(65) Prior Publication Data
US 2016/0053724 A1    Feb. 25, 2016

(30) Foreign Application Priority Data
Mar. 28, 2013   (DE) .................. 10 2013 205 722

(51) Int. Cl.
*F02M 21/04* (2006.01)
*F02D 41/00* (2006.01)
(Continued)

(52) U.S. Cl.
CPC ......... *F02M 21/04* (2013.01); *F02B 29/0418* (2013.01); *F02B 37/16* (2013.01);
(Continued)

(58) Field of Classification Search
CPC ............... F02D 41/0027; F02D 19/081; F02D 41/0025; F02D 19/0607
See application file for complete search history.

(56) References Cited

U.S. PATENT DOCUMENTS

| | | | |
|---|---|---|---|
| 6,945,221 B2* | 9/2005 | Baeuerle | F02B 33/446 123/319 |
| 7,174,250 B2* | 2/2007 | Barba | F02D 41/0072 123/568.21 |
| 8,340,885 B2 | 12/2012 | Baldauf et al. | |
| 8,683,983 B2 | 4/2014 | Baldauf et al. | |
| 2006/0167613 A1* | 7/2006 | Barba | F02D 41/0072 701/108 |
| 2010/0256890 A1* | 10/2010 | Baldauf | F02D 29/06 701/102 |

(Continued)

FOREIGN PATENT DOCUMENTS

| | | | |
|---|---|---|---|
| DE | 102007045195 B3 | 3/2009 | |
| DE | 102007056623 B3 | 5/2009 | |

(Continued)

*Primary Examiner* — Long T Tran
(74) *Attorney, Agent, or Firm* — Lucas & Mercanti, LLP; Klaus P. Stoffel

(57) ABSTRACT

A gas internal combustion engine, having a gas mixer, an intake section and an engine to which a fuel mixture having a charging mixture is fed. The engine is operated in the gas mode with gas as the fuel in the charging mixture. By an input mixture portion, from an earlier mixture state, of a gas/air mixture, an output mixture portion, from a later mixture state, of the gas/air mixture is determined by an intake section model. The output mixture portion is determined at an engine feed, the input mixture portion is determined over a number of intermediate states of the mixture portion in a number of assigned volumes of the intake section. The intake mixture portion of a gas/air mixture is determined at the gas mixer, and an air stream and/or gas stream is set at the gas mixer in accordance with the input mixture portion.

13 Claims, 3 Drawing Sheets

(51) Int. Cl.
    *F02B 29/04* (2006.01)
    *F02D 19/02* (2006.01)
    *F02D 19/10* (2006.01)
    *F02M 43/00* (2006.01)
    *F02B 37/16* (2006.01)
    *F02M 25/07* (2006.01)
    *F02D 41/14* (2006.01)

(52) U.S. Cl.
    CPC ......... *F02D 19/023* (2013.01); *F02D 19/105* (2013.01); *F02D 41/0027* (2013.01); *F02M 21/047* (2013.01); *F02M 25/0706* (2013.01); *F02M 43/00* (2013.01); *F02D 2041/1433* (2013.01); *F02D 2041/1434* (2013.01); *F02D 2200/0402* (2013.01); *Y02T 10/144* (2013.01); *Y02T 10/146* (2013.01); *Y02T 10/32* (2013.01); *Y02T 10/36* (2013.01)

(56) References Cited

U.S. PATENT DOCUMENTS

2012/0109499 A1* 5/2012 Klaser-Jenewein .... F02D 29/06
                                                    701/103

FOREIGN PATENT DOCUMENTS

| DE | 102008022214 | B3 | 11/2009 |
|---|---|---|---|
| EP | 1398490 | A2 | 3/2004 |
| EP | 1878900 | A2 | 1/2008 |
| EP | 2199580 | A1 | 6/2010 |
| WO | 2005028837 | A2 | 3/2005 |
| WO | 2011000474 | A1 | 1/2011 |

* cited by examiner

METHOD AND DEVICE FOR OPERATING A GAS INTERNAL COMBUSTION ENGINE The present application is a 371 of International application PCT/EP2014/000142, filed Jan. 20, 2014, which claims priority of DE 10 2013 205 722.9, filed Mar. 28, 2013, the priority of these applications is hereby claimed and these applications are incorporated herein by reference.

BACKGROUND OF THE INVENTION

The invention relates to a method for operating a gas internal combustion engine having a gas mixer, an intake path and an engine having a number of cylinders. The invention further relates to a control system for the internal combustion engine and an internal combustion engine. The gas internal combustion engine further has, in the intake path, a forced-induction unit and a bypass path r bypassing the forced-induction unit. In particular, the gas internal combustion engine is a spark-ignition gas internal combustion engine.

Fields of application for this type of gas internal combustion engine are mobile applications—such as marine engines or utility vehicles and heavy goods vehicles—and also static applications such as local power plants which are in particular advantageously to be configured for a variable gas supply.

U.S. Pat. No. 6,131,552 discloses, in general terms, a fuel control system which can regulate the supply of gas to a mixing chamber as a function of a measured operating state of the engine. The control method of U.S. Pat. No. 6,131,552 A or other purely load-dependent gas meterings prove unsatisfactory even in the case of complex control systems.

Customarily, air consumption is a measure of the gaseous fresh charge of charge air supplied to a combustion engine in a charge mixture, wherein the air consumption also permits monitoring of the quality of the intake system and intake process. The actual air consumption generally represents the ratio of the mass of fresh air in a charge mixture actually supplied to the engine or to a cylinder thereof, during an operating cycle. This real mixture mass is, with reference to the theoretical fresh charge mass, determined from the geometric displacement volume and the theoretical charge density under atmospheric conditions (in the case of naturally aspirated engines) or, in the case of forced-induction engines, in this case the state of the fresh charge downstream of the compressor or downstream of the charge air cooler is taken into account.

Fresh charge supplied to a cylinder is affected by a number of factors such as the valve control times or the opening cross section of the valves. This can in principle be determined by a module for determining the engine forced induction, which is supported by an intake path model. In actual fact, however, only in exceptional cases does the fresh charge supplied to the engine in a charge mixture correspond to the theoretical. Air consumption is not a constant value for an engine, but is greatly dependent on the engine speed and the actual geometric ratios of the intake tract and the combustion space; in order to overcome this dependency it is possible to refer for example to a suitable characteristic map.

Intake path models, in turn, are in principle known in engine controllers in the context of general internal combustion engines, such as in EP 1 398 490 A2. Common to these is the widely adopted fundamental concept for modeling the intake path—in the simplest case as a homogeneous pressurized container in order to detect the dynamic processes in the air path—of modeling the storage behavior of the intake path (also termed suction tube) by means of the filling and emptying methods. In that context, the suction tube is treated as a pressurized container which is continuously filled with air via a throttle flap and out of which the engine sucks air via the inlet valve by means of its suction behavior corresponding to the working rhythm.

However, it has been found that fuel supply for a gas internal combustion engine, in particular in the transient operating range of the internal combustion engine and in the event of variable fuel qualities, is still very much more complex. In particular, it can be seen in the context of gas internal combustion engines, in particular for designing a spark-ignition gas internal combustion engine, that operation in the low-load range and/or in the transient-load range can be problematic.

In the operation of gas engines, the mixture is commonly formed upstream of the compressor of the exhaust-gas turbocharging. At the same time, the intake path between the compressor outlet and the combustion space inlet consists of partially large volumes which thus store or discharge significant masses of mixture. This is in particular the case when, in the event of changes in load on the engine and/or in engine speed, there arise in the individual partial volumes changes in pressure and/or in temperature. As a consequence of a suitable mixture mass formation, however dictated only by the operating point—because this is imprecise in particular due to the partially large volumes—in the case of a gas internal combustion engine, high hydrocarbon emissions (HC emissions) or other raised emissions (NOx, CO, particulates, etc.) as well as low efficiencies are to be expected as a consequence of un-combusted combustion gas.

It is desirable to provide a more advantageous gas operation of a gas internal combustion engine in particular in the transient, in accordance with the load requirements and also the emissions requirements. It is in particular desirable to realize this at least in the low-load range. It is in particular desirable to realize this in the full-load range, i.e. preferably up to 100%.

SUMMARY OF THE INVENTION

This is the starting point of the invention, the object of which is to specify a method and a device by means of which improved operation of an internal combustion engine as a gas internal combustion engine is achieved. In particular, the invention has the object of achieving an improvement in transient operation and/or an improvement in terms of emissions. Preferably, an existing problem of a fuel composition in the low-load range is to be solved in an improved manner, in particular avoiding jumps in the torque of an engine in continued transient operation, even in the case of changing load requirements and as far as possible avoiding excessive emissions. In particular, as advantageous as possible a configuration of a mixture mass formation should be possible. In particular, an improved configuration of an air consumption of the engine should be possible. The invention has the particular object of addressing at least one of the above-described problems. At least, an alternative solution is to be proposed.

In particular, the starting point in that context is a method of the type mentioned in the introduction for operating a gas internal combustion engine, having a gas mixer, an intake path and an engine having a number of cylinders, wherein in the method the engine is supplied with a fuel mixture comprising a charge mixture and the engine is operated in gas operation with gas as fuel in the charge mixture.

It is further provided that an output mixture fraction, assigned to a later mixture state, of the gas-air mixture is determined by means of an input mixture fraction, assigned to at least one earlier mixture state, of a gas-air mixture, and wherein the determining takes place by means of an intake path model serving as the basis for a computational model for the intake path.

It is provided according to the invention that the output mixture fraction of the gas-air mixture is determined at an engine supply and the input mixture fraction is determined from the output mixture fraction via a number of intermediate states of the mixture fraction in a number of assigned volumes of the intake path. To that end, the input mixture fraction of a gas-air mixture is determined at the gas mixer and an air flow and/or a gas flow at the gas mixer is set as a function of the input mixture fraction. Advantageously, an air flow and/or a gas flow can be set at the gas mixer as a function of the input mixture fraction, in particular of a mixture mass flow, within the context of a simultaneous real-time calculation.

The invention proceeds from the consideration that advantageous transient operation of a gas internal combustion engine should take place as far as possible taking into account a state pressure of the intake path, in particular taking into account a throttling of the charge air or of the fuel mixture, and/or taking into account, in a manner improved as far as possible, of the air consumption, wherein the particularities of a gas engine are to be taken into account. Intake path models in engine controllers are indeed known in principle. However, the invention proceeds from the consideration that, specifically for the application of the gas engine, in particular with mixture formation upstream of a compressor, the very approach of the modeling mentioned in the introduction is insufficient.

The invention first takes into account the consideration that in the case of a gas engine a path between a mixing location, e.g. upstream of the compressor of the exhaust-gas turbocharging, and a combustion space inlet location can be relatively long and thus in itself comprises a relatively large volume which can hardly realistically be described in a static state. Also, the invention first takes into account that in the case of a gas engine the intake path between the compressor outlet and the combustion space inlet consists of partially large volumes which store or discharge significant mixture masses in the event that changes in engine load and/or engine speed give rise to changes in pressure and/or temperature in the individual partial volumes.

The invention has recognized that for that reason—specifically in the case of a gas engine—the mixture mass flow at the outlet of the gas mixer is temporarily decoupled from that at the combustion space inlet. This circumstance is not currently sufficiently accounted for in intake path models, in particular not for a gas engine. In particular, customary static considerations of a gas engine, which consider only the mixture pressure upstream of the cylinder, are therefore—as recognized by the invention—not adequate to ensure that defined combustion air ratios are observed. Thus, the concept of the invention serves to provide a mixture mass sensor which is improved with respect to reliability and is better adapted to transient operation, in particular a virtual mixture mass sensor for mixture formation upstream of the compressor.

The object relating to the device is achieved with the invention by a control system for a gas internal combustion engine.

The concept of the invention also presents, for achieving the object relating to the device, a gas internal combustion engine.

In particular, an internal combustion engine can have the engine with a number of cylinders and an intake system with the gas mixer and the intake path. Furthermore, it has proven advantageous to arrange, with respect to the number of cylinders, a receiver volume upstream of the cylinders, which receiver volume can for example be designed as a manifold or as a mixing path or the like.

In particular, it has proven advantageous to provide the gas internal combustion engine with a forced-induction unit in the intake system, in particular with a forced-induction unit comprising an intercooler. Depending on the dimensions of the gas internal combustion engine, in particular on the basis of a large engine, a forced-induction unit can be one- or two-stage and preferably provided with exhaust-gas recirculation. In particular, it is further possible for a bypass path to be provided for the intake path of the intake system, for bypassing the forced-induction unit.

As shown in particular in circular process simulations and tests on gas engines, the invention improves the stability of the combustion air ratio especially in the case of transient engine operation (increasing/decreasing load), such that on one hand it is possible to envisage larger jumps in load and on the other hand it can become simpler to determine the load-switching operation, also on the test bed. Furthermore, the use of a virtual gas sensor according to the concept of the invention contributes to achieving current and future exhaust-gas standards.

These and other advantageous refinements of the invention can be found in the subclaims and indicate in detail advantageous possibilities for embodying the concept of the invention within the scope of the refinements and with indication of further advantages.

Within the context of a particularly preferred refinement, it is ensured in the approach that an air flow and/or a gas flow is set at the gas mixer as a function of the input mixture fraction within the context of a simultaneous real-time calculation. In particular, a mixture mass sensor according to the concept is envisaged as a virtual mixture mass sensor, which advantageously delivers the mixture mass flow at the gas mixer outlet; this advantageously in comparison to current approaches.

In particular, the input mixture fraction of a gas-air mixture can be determined at an outlet of the gas mixer and/or the output mixture fraction of a gas-air mixture can be determined at a cylinder or a cylinder inlet of the engine or a receiver.

Particularly advantageously, the input mixture fraction of a gas-air mixture is determined at an outlet of the gas mixer and/or the output mixture fraction of a gas-air mixture is determined at a cylinder or a cylinder inlet of the engine, in particular at a receiver. Particularly advantageously, the state pressure is determined upstream of a cylinder of the engine, preferably as a receiver pressure in the receiver volume and a receiver volume is to be understood as any type of volume arranged upstream of the cylinder and downstream of a forced-induction unit and/or of a bypass path. For example, a receiver volume can be the volume of a manifold or another widening of the construction space of the intake path. In particular, a receiver volume is to be understood as a volume beyond the usual volumes of an intake path; it can be seen within the scope of the refinement that predefining the receiver pressure in the receiver volume is particularly significant for the reliable control of the gas internal combustion engine, since increasing size of a receiver volume is linked with increasing uncertainty in the state of the combustion gas mixture. Controlling the receiver pressure in the receiver volume thus avoids imponderables which exist in the case of static assumptions relating to an intake path.

Preferably, determining a mixture fraction involves determining a mixture mass flow, in particular by means of a throughflow equation for a determined volume and/or a component of the intake path and/or a throttle member. In particular, a mixture mass flow is assigned to the input mixture fraction at the gas mixer and/or a mixture mass flow is assigned to the output mixture fraction. In particular, a mixture mass flow can be determined at a throttle, wherein a throughflow of a recirculation and/or of a forced-induction flow is determined. This can preferably be realized by means of a throughflow equation for compressible media at an ideal or real nozzle, assuming a flow of ideal or real gases which is frictionless or is subject to friction.

Preferably, determining a mixture fraction additionally or alternatively involves determining a mixture state, in particular at least determining a temperature and/or a state pressure of the mixture fraction for the volume of the intake path. This is preferably performed using a thermodynamic state equation for real or ideal gases.

It has proven advantageous to take into account a state pressure in the intake path, e.g. in large volumes or as a pressure loss across throttles. Actuators thereof can be provided to influence the state pressure, such as at a throttle flap, a throttle valve or other throttle members. A throttle member of the intake path is in the present case considered to be any means for pressure reduction or generally pressure control, this can possibly include, in addition to an engine throttle, also a compressor bypass throttle. In particular, an engine throttle can also be a valve, a flap or a throttle or also a variable turbine geometry of a compressor. A setting angle $\alpha$ between an entirely open and an entirely closed setting of the throttle is here used in general to describe a throttle setting of such throttle members; it is also possible for multiple throttle members of the above-mentioned type, or a combination of various thereof to be used independently or in conjunction with one another.

In particular, an engine throttle can be provided upstream of the receiver volume and/or a compressor bypass throttle can be provided in the bypass path. It is possible, in particular depending on a SETPOINT and/or ACTUAL state pressure of the intake path, to undertake throttling of the intake path, in particular for throttling the engine and/or the bypass path.

In one particularly preferred embodiment, one refinement provides for dividing the intake path—i.e. between the gas mixer and engine—into multiple volumes, in particular at least two volumes and preferably exactly two large volumes.

This approach has proven to be of advantage, wherein in particular one or more of the following steps is used:
 the filling and emptying method (in particular using pressure and temperature information inter alia from already-present measurement points),
 real-time calculation, in the engine controller, of the mixture mass flows at various points of the intake path,
 admixing of that gas mixer by means of a gas metering unit, which leads to the virtually determined mixture mass in the desired combustion air ratio.

Advantageously, a combustion air ratio is assigned to the input mixture fraction, in particular a SETPOINT value (Lambda_SETPOINT) thereof, wherein a gas metering unit of the gas mixer is controlled by means of the stoichiometric air requirement (L_st) and/or by means of the combustion air ratio. This measure has proven useful for controlling a gas mixer.

In particular, the mixture fraction, in particular a mixture mass flow and/or a mixture state of an intermediate state, can be determined in the volume of the intake path for a number of theoretical computational volumes of the intake path and/or for a number of real housing volumes of the intake path, wherein the number of intermediate states of the mixture fraction in the intake path are assigned to a number of at least one large volume(s) of the intake path. The intake path model can thus be made particularly realistic.

Preferably, the state pressure is determined virtually, in particular simulated and/or calculated, on the basis of a computational model of the intake path comprising at least computational volumes of the receiver volume and/or of the intercooler. Within the context of a particularly preferred refinement, the state pressure is determined as a receiver pressure in a receiver volume upstream of a cylinder of the engine, which is arranged upstream of the cylinder and is arranged downstream of a forced-induction unit and/or of a bypass path. An intercooler volume is to be understood in principle as any type of volume connected with temperature exchange; this can in particular include volumes of the intake path and/or of the engine supply path of the intake tract. The above-mentioned volumes have proven to be particularly relevant for describing the intake path.

Preferably, a number of large volumes of the intake path comprises one or more component volumes of the intake path which are chosen from the group comprising: at least one, preferably two, receiver volumes, at least one cylinder volume, in particular in the engine block, at least one intercooler volume, at least one compressor volume.

More preferably, the number of at least one large volume(s) of the intake path comprises one or more component volumes of the intake path which are chosen from the group further comprising: at least one compressor bypass volume, in particular at a bypass pipe section and/or a compressor bypass flap; at least one intake path volume, in particular at an intake pipe section and/or at an engine throttle flap and/or inlet throttle flap.

Preferably, the gas operation is a spark-ignition gas operation; this proves to be particularly efficient and can be suitably realized for many applications. In principle, however, another ignition principle can also be suitable, such as an ignition system for diesel or other liquid fuel ignition. In particular, the gas operation can alternatively also be an ignition-jet operation with external mixing of a gas-air mixture and using a diesel-ignition jet or another liquid fuel ignition jet.

In general, even if not prominently described here, there is equally the possibility, not least because of comparatively constant fuel quality, to operate the gas internal combustion engine either with gas or with liquid fuel such as diesel or liquefied gas. In operation, the engine is then supplied with a fuel mixture comprising a charge mixture and/or a liquid fuel. The engine can then be operated in a first operating state in diesel operation—with diesel or another liquid fuel—and in a second operating state in gas operation—with gas as fuel in the charge mixture. This type of gas internal combustion engine is also termed multi-fuel internal combustion engine (dual-fuel internal combustion engine) and can also be operated with, in addition to the preferred fuel choice of diesel and gas, a great many other fuels. It is in particular possible, alternatively in gas operation, for the gas internal combustion engine in ignition-jet operation to be operated with external mixing of a gas-air mixture and a diesel ignition jet. Thus, engines of the gas internal combustion engine are also termed ignition-jet engines and are generally constructed on the basis of a diesel engine construction and are amongst the newest technologies, in particular in the field of environmentally friendly application possibilities for large engines. An ignition-jet engine can also be operated with liquid fuel such as diesel or another liquefied fuel such as liquefied natural gas (LNG) or also liquefied petroleum gas (LPG); generally, a gas internal combustion engine can have a gas-diesel engine to form a gas-diesel internal combustion engine.

In particular, a gas internal combustion engine then has an injection system which can preferably be controlled electronically. In particular, an internal combustion engine can to that end further have an injection system which is advantageously designed as a common rail injection system. In particular, an injection system can be adjusted for various grades of gas, such as biogas or petroleum gas, in liquid form or also for the use of oils such as vegetable oils or the like as liquid fuel. Primarily common rail injection systems but in certain cases also pump-nozzle injection systems with electronic control have proven to be of great use in this context. In gas operation the ignition medium can be added at high pressure to the gaseous fuel proper of the charge mixture or can also be added to the intake duct. Gas engines operating in gas operation, in particular spark-ignition gas operation or ignition-jet operation, with external mixing, are overall more flexible in the use of fuel and produce fewer emissions.

Exemplary embodiments of the invention will now be described below with reference to the drawing in comparison with the prior art, which is also partly represented. This is not necessarily intended to represent the exemplary embodiments true to scale, but rather the drawing, where expedient for the purposes of explanation, is schematic and/or slightly distorted. In respect of additions to the teachings which can be directly recognized from the drawing, reference is made to the relevant prior art. In that context, it is to be taken into account that a great many modifications and changes relating to the form and the detail of an embodiment can be undertaken without departing from the general idea of the invention. The features of the invention disclosed in the description, in the drawing and in the claims can be essential for the refinement of the invention, either on their own or also in any combination. In addition, the invention encompasses all combinations of at least two of the features disclosed in the description, the drawing and/or the claims. The general idea of the invention is not restricted to the exact form or the detail of the preferred embodiment shown and described in the following, or restricted to subject matter which would be restricted in comparison to the subject matter claimed in the claims. In the case of cited ranges of dimensions and ratings, values which are within the cited limits are also disclosed as limit values and can be used and claimed as desired. Further advantages, features and particularities of the invention will emerge from the following description of the preferred embodiments and with reference to the drawing; individually, the drawings show, in:

DETAILED DESCRIPTION OF THE INVENTION

Figure 1:
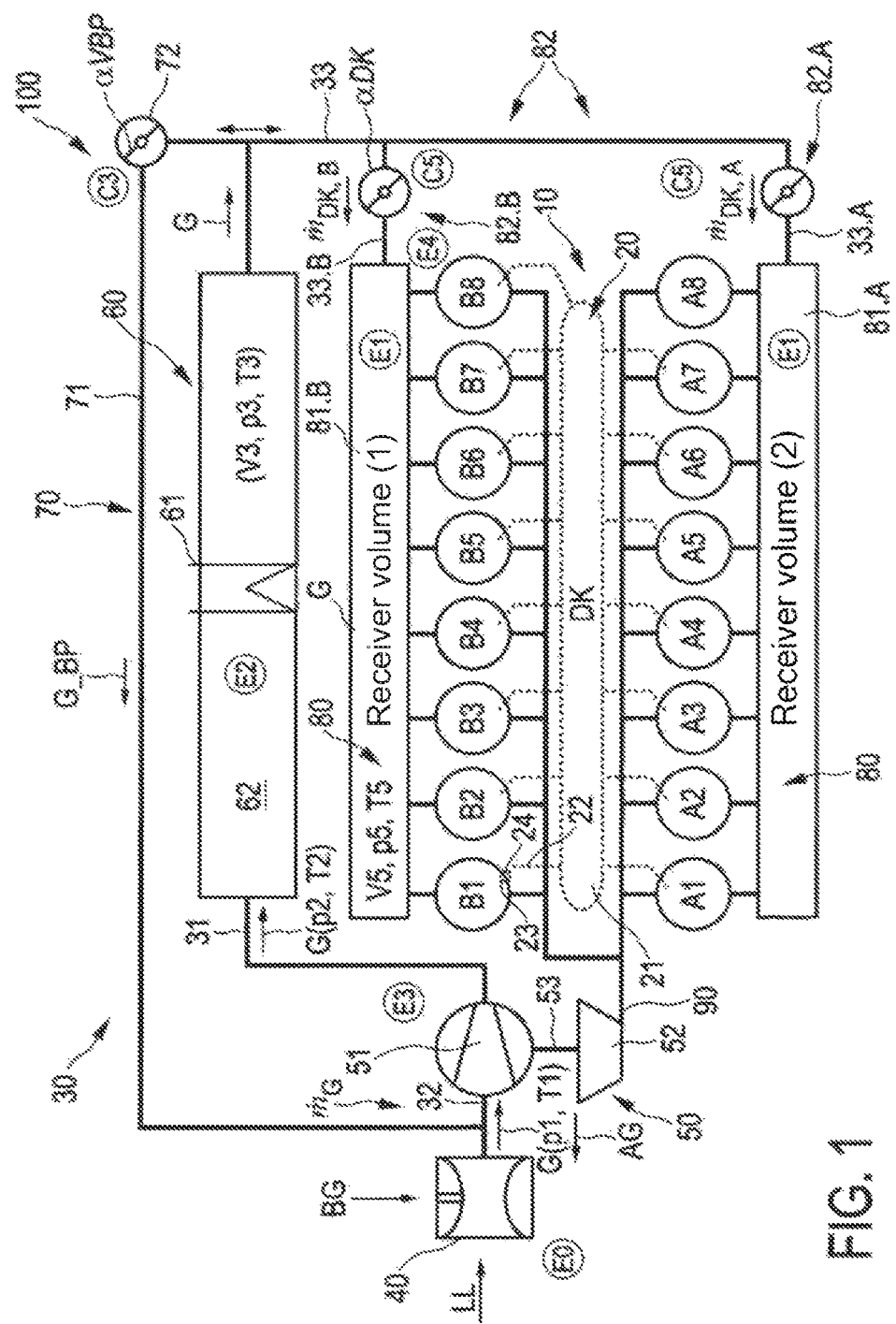
FIG. 1 a map of a gas internal combustion engine having a gas mixer and an intake path with forced-induction by means of a turbocharger and an intercooler, and having an engine with a number of cylinders downstream of a receiver volume, wherein the forced-induction unit can be bypassed by means of a bypass path—the gas internal combustion engine is configured for spark-ignition gas operation; in an alternative, shown in dotted lines, the gas internal combustion engine can also be configured as a gas-diesel internal combustion engine and can be operated, both in pure diesel operation and in mixed operation or in pure gas operation (e.g. as ignition-jet operation, with injection of an ignition mixture in the form of diesel), wherein the injection system is designed in the form of a common rail system (shown in dotted lines)

FIG. 1 shows a gas internal combustion engine 100, having an engine 10 and an intake system with a branched intake path 30. In the intake path there are arranged, inter alia, a gas mixer 40 and, to form a forced-induction unit, a turbocharger 50 and an intercooler 60, in this case in the form of a charge air cooler, and a bypass 70.

In the present case, the engine is embodied with sixteen cylinders, as a V-engine with eight cylinders Ai, i=1 . . . 8 on an A side and eight cylinders Bi, i=1 . . . 8 on a B side; this type of cylinder arrangement and number of cylinders is represented in the present case merely by way of example. In particular for large-engine applications, other suitable engine configurations comprise ten, twelve, twenty, twenty-four or twenty-eight cylinders, or a different number of cylinders.

In the case of an alternative or additional configuration as a dual-fuel internal combustion engine, the internal combustion engine also has an injection system 20 (shown in dotted lines) which in the present case is formed as a common rail system with a common rail 21 from which there branch off a number of injection lines 22—each having an injector 23 and an individual reservoir 24 arranged upstream of the injector—each for one cylinder Ai, Bi, i=1 . . . 8 of the engine 10. The injection system 20 is designed to meter liquid fuel such as diesel or a different liquefied or liquid fuel, in order to inject the latter in diesel operation as liquid fuel or in gas operation or ignition-jet operation as ignition jet, in each case at the beginning of a working cycle of a cylinder Ai, Bi; this at very high injection pressures. Accordingly, the engine 10 also has in this variant a common rail injection system 20 for a liquid fuel, here in particular diesel fuel, and a forced-induction unit 50 with an intercooler 60 and with a bypass 70 for bypassing the forced-induction unit 50 and the intercooler 60.

With further reference to the essential part of the embodiment, shown in solid lines, the gas mixer 40, connected to the intake path 30 at the inlet-side end of the intake system, draws in charge air LL from the environment and mixes it with combustion gas BG. The charge mixture, in gas operation also termed combustion gas mixture—in the following also "mixture G" for short—with mass throughflow m(')_G (for the sake of clarity, "(')" is represented in the drawing as a dot above the mass m or other variable) and at intake pressure p1 and at intake temperature T1, which essentially corresponds to the ambient temperature, is fed via a compressor path 32 to a compressor 51 of the turbocharger 50 where it is compressed to a compression pressure p2 at a compression temperature T2. The compressor 51 is driven by a turbine 52 and is mounted with the latter on a common charger axis 53; the turbine 52 of the exhaust-gas tract 90 is in turn driven by the exhaust gas AG, leaving the engine 10, in the exhaust-gas tract 90. The mass flow m(')_G of the mixture G, heated to the compression temperature T2 as a consequence of the compression, is fed to a cooling path 31 of the intake path 30 where it is introduced into an intercooler 60 via a cooler structure 61; in the heat exchanger volume 62, represented symbolically here, there takes place an exchange of heat with a coolant in the cooler structure 61, such that the mixture G is cooled. The combustion gas mixture leaves the heat exchanger volume of variable V3 in cooled form, at a charge temperature T3 and a charge pressure p3, in the direction of a charge path 33 for feeding the mixture G to the engine 10.

In an intake path model, the state of the mixture G upstream of the compressor 51 by comparison is indicated generally by means of the state variables for pressure and temperature, in this case intake temperature T1 and intake pressure p1 upstream of the compressor 51, or as the case may be downstream of the compressor 51 at increased compression pressure p2 and increased compression temperature T2 with the state variables p2, T2 downstream of the compressor 51, and is described by means of a suitable compressor model; this may be according to a gas state equation such as for an ideal or real gas. As large volumes of the intake path 30 according to the concept of the invention, particular importance is attached to the following components of the heat exchanger 60 and of the receiver 80, such as for example assigned to a manifold and/or a collection path, such that there is assigned to these and to the wider space of the intake path, for modeling the further gas states, a heat exchanger volume V3 or a receiver volume V5 in the intake path model. Accordingly, the combustion gas mixture G in the heat exchanger volume V3 adopts the state variables p3, T3, this as a consequence of the cooling and of an increase in volume with decreasing charge pressure and charge temperature p3, T3.

The state of the mixture G in the bypass 70 is in principle also determined as a function of the state variables p1, T1 at the inlet to, or p3, T3 at the outlet of the bypass 70, or vice versa in the case of recirculation flow through the bypass 70; i.e. a bypass gas mixture G_BP in the bypass path 71 of the bypass 70 establishes itself depending on the prevailing pressure ratios and on the setting of the compressor bypass throttle 72—in this case according to the setting angle αVBP of the compressor bypass flap. A bypass path 71 can in particular serve for re-circulating excess mixture G upstream of the compressor 51, in order to again supply this, re-compressed, for combustion in the cylinders Ai, Bi of the engine 10.

Before the gas mixture G in the state p3, T3 is fed to the engine 10, it is fed to the receiver 80, changing pressure and temperature in accordance with a mass flow m(')_DK fed into the receiver volume 81 via the engine throttle 82—and in accordance with the receiver volume V5 at a receiver pressure p5 and a receiver temperature T5. In the present case, a first and a second receiver volume 81.B, 81.A are respectively assigned to a B side and to an A side of the engine 10, i.e. these are arranged upstream of the cylinders Ai, Bi and downstream of the first and second charge path 33.B, 33.A of the B side and A side and downstream of the heat exchanger volume 62. The engine throttle 82 is formed in the present case by a first and a second engine throttle flap 82.B, 82.A, each of which is assigned to the first and second receiver volume 81.B, 81.A accordingly, wherein the first and second engine throttle flaps 82.B, 82.A can be set independently of one another; in the following, these are referred to—where it is simpler to do so—together as the engine throttle 82. The receiver volume 81 is to be understood as the sum of the first and second receiver volumes 81.A and 81.B. In the receiver volume 81, the mixture G adopts the gas states labeled p5 and T5 as a consequence of the increase in volume and as a function of the setting αDK of the engine throttle flaps 82.A, 82.B in the volume V5 of the receiver volume 81; this in dependence on the B-side or A-side mass throughflow m(')_DK, B or m(')_DK, A depending on the setting of the engine throttle flaps 82.B and 82.A.

The states of the gas mixture G, labeled pi, Ti, i=1,2 or Vj, pj, Tj, j=3,5, are determined in the case of this embodiment essentially in the regions as defined by the compressor 51, the heat exchanger volume 62 and the receiver volume 81, or against the limits imposed by the engine throttle 82 and the compressor bypass throttle 72 or the compressor 51.

In the following, on account of the intake path model of a gas internal combustion engine 100 represented here, there results for the receiver pressure p5 in the receiver volume V5 or for the control variables based on the receiver pressure p5—such as an ACTUAL receiver pressure p5_ACTUAL or a SETPOINT receiver pressure p5_SETPOINT or a simulated receiver pressure p5—a role for determining an input mixture fraction of a gas-air mixture at the gas mixer 40 via a number of intermediate states of the mixture fraction in a number of assigned volumes of the intake path 30.

It can be seen that the mass flows m(')_G for combustion gas BG and m(')_LL for charge air LL at the gas mixer 40 can be set according to a combustion air ratio LAMBDA_SETPOINT or a stoichiometric air ratio Lst not necessarily with the assumption of static conditions along the intake path. The concept of the embodiment therefore takes into account in an intake path model—such as described with reference to FIG. 1—at least two large volumes in order to summarize the volume of the intake path, namely the receiver volume 80 and the intercooler volume 62. In the context of the intake path model, the intake path 30 is modeled on the basis of the well-known principle of a filling and emptying method. The changes of state in the volumes are in the present case considered quasi-isothermal. This simplifies the system by limiting to conservation of mass in comparison to the adiabatic viewpoint and in particular simplifies simultaneous calculation of the internal combustion engine or of the intake path thereof in real-time. It is however in principle also possible to use an adiabatic or polytropic viewpoint or a targeted transfer of heat in the case of sufficient computation capacity, in order to simulate the changes of state in the intake path.

Figure 3:
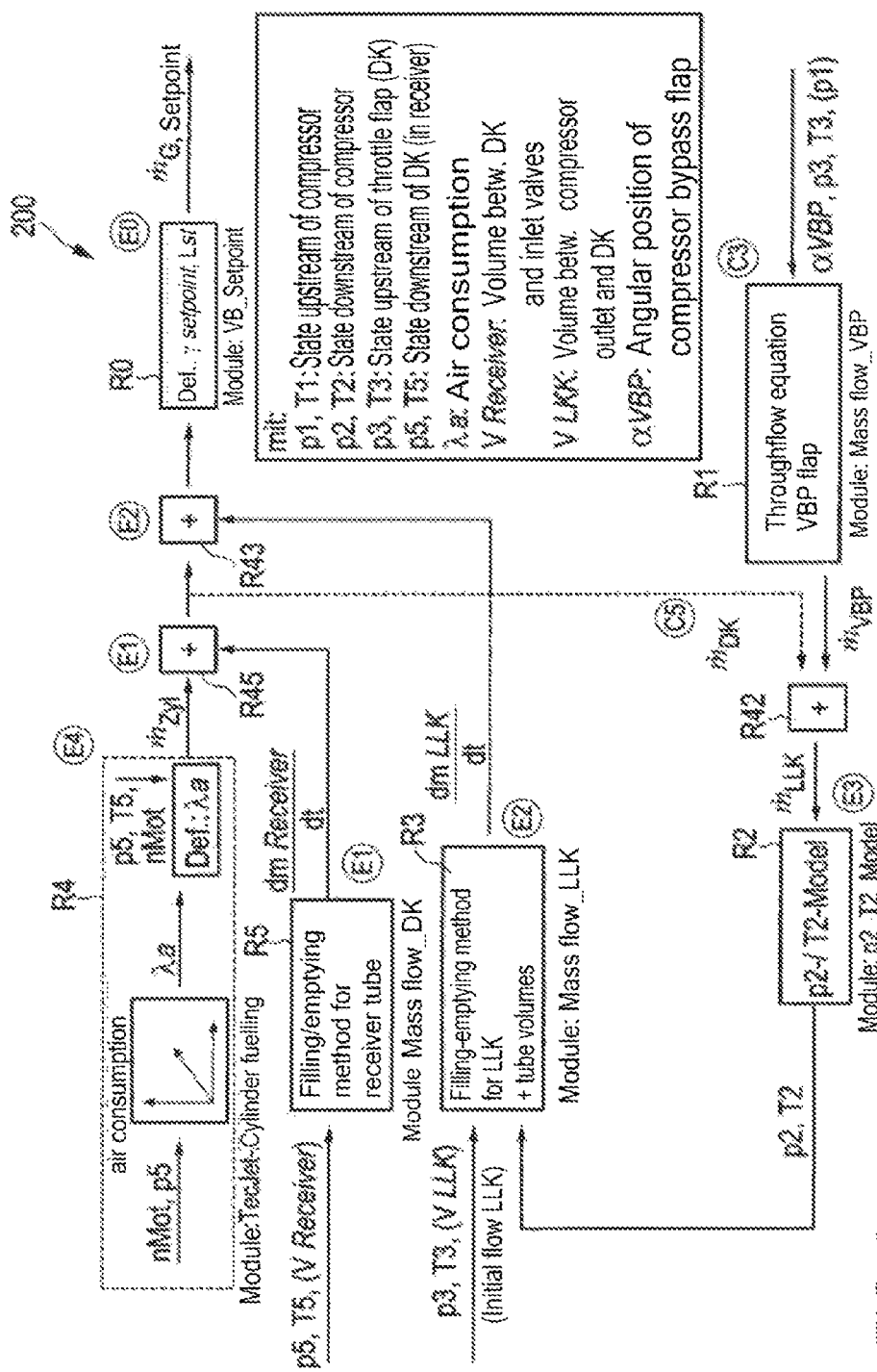
FIG. 3 a schematized representation of a preferred embodiment of a controller structure for dual-fuel operation, wherein the input mixture fraction of a gas-air mixture of the gas mixer is determined from the output mixture fraction of a gas-air mixture supplied to the engine via a number of intermediate states of the mixture fraction in the intake path by means of the intake path model.

FIG. 3 further shows that, in addition, it is possible for specific assumptions for devices of the intake path to be converted in the context of additional models, in particular when measurement values for the corresponding device of the intake path 30 are not available. This relates for example to the additional model of a compressor (p2_T2 module) which describes the action of the compressor 51 and the states of the mixture G upstream of the compressor by means of temperature and pressure (G(p1, T1)) and downstream of the compressor (G(p2, T2)). This also relates for example to the additional model for a compressor bypass flap (mass flow_VBP), which describes a mass flow through the compressor bypass flap within the context of a throughflow equation.

In operation, a fuel mixture comprising a charge mixture is fed to the engine 10. The engine is then operated with gas as fuel in the charge mixture. An output mixture fraction (mass flow m(')_G,CYL) of the gas-air mixture, assigned to a later mixture state (with state variables p5, T5), is used according to an intake path model—as is described in FIG. 3 with the structure of the controller 200—to determine an input mixture fraction (mass flow m(')_G,SETPOINT) of a gas-air mixture, assigned at least to an earlier mixture state (with state variables p0, T0). The determining is performed by means of the intake path model as the basis for a computational model for the intake path 30, the gas mixer 40 and the receiver 80, or the inlet to the engine 10.

It is provided, according to the concept of this embodiment, that the output mixture fraction (mass flow m(')_G, CYL) of the gas-air mixture is determined at an engine supply—in the present case at a receiver 80. The input mixture fraction (mass flow m(')_G,SETPOINT) is determined from the output mixture fraction (mass flow m(')_G, CYL) via a number of intermediate states (with state variables pi, Ti, i=5, 3, 2, 1) of the mixture fraction—in the present case in the context of a simultaneous real-time calculation. The number of intermediate states (with state variables pi, Ti, i=5, 3, 2, 1) are assigned to a number of volumes (Vi, i=5, 3, 2, 1) or to the components E1, E2, E3, E4 and C3 and C5 in the intake path. The input mixture fraction of a gas-air mixture is determined at the gas mixer 40, and an air flow and/or a gas flow BG is set at the gas mixer 40 as a function of the input mixture fraction.

In the present case, in the intake path model, a number of large volumes are assigned to the intake path; these include: two receiver volumes 81.B, 81.A (with assigned volume V5 and with state variables p5, T5 of a charge mixture therein), at least one cylinder volume in the engine block, at least one intercooler volume 62 (with assigned volume V3 and with state variables p3, T3 of a charge mixture therein), at least one compressor volume at the compressor 51 (with value V2 and with state variables p2, T2 of a charge mixture at the outlet thereof) or the states upstream of the compressor 51 (with state variables p1, T1 of a charge mixture) and with state variables p0, T0 of the surroundings (atmosphere) of intake air, as is indicated in FIG. 1.

The components E1, E2, E3, E4 and C3 and C5 of the intake system, also shown in FIG. 1, are considered in the present intake path model and the states or mass flows of the charge mixture are in this regard simulated or calculated. This has been selected in the present case merely as a preferred example from a range of other possible examples; for example, a modified intake path model can also consider further components in the case of a two-stage forced-induction unit. It is also in principle possible for further volumes to be considered in an intake path model. In extremis, the intake path can be broken down into finitely small or infinitesimal partial volumes and a determination for the states and mass flows of the charge mixture is then performed as a solution, inter alia, to a difference or differential equation system; this consideration of the model refinement can be arrived at taking into account the computational effort and the complexity of the intake path to be simulated; in particular taking into account a real-time capability.

Figure 2:
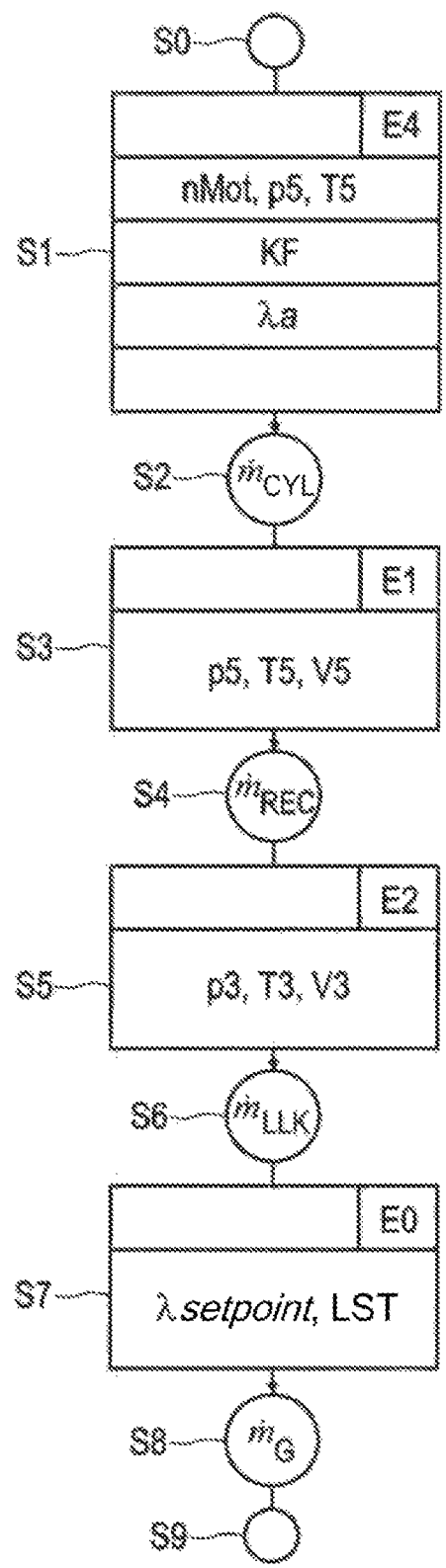
FIG. 2 a flow chart of a preferred embodiment of a method for determining, in the context of a simultaneous real-time determining of an input mixture fraction assigned to an earlier mixing state of a gas-air mixture by means of an output mixture fraction assigned to a later mixture state of a gas-air mixture, wherein the input mixture fraction of the gas-air mixture is determined at the gas mixer and an air flow and/or a gas flow is set at the gas mixer as a function of the input mixture fraction.

To that end, FIG. 2 shows, in principle and as a flow chart, the sequence of a preferred embodiment of an operating method for a gas internal combustion engine 100 with a gas mixer 40, an intake path 30 and an engine 10, also termed gas engine in the present case, with a number of cylinders Ai, Bi, i=1 . . . 8, as has been described with reference to FIG. 1. It is in principle possible for the operating method to be realized at a gas mixer 40, implementing a determining method, represented in FIG. 2, for setting variables, by means of which it is possible to set an air flow LL and/or a gas flow BG. With reference to FIG. 2, the method provides in the present case, on the basis of the intake path model shown here, in step S0 further steps S1 to S9 which relate to the above-described components E1, E2, E3, E4 and C3 and C5, established by means of the intake path model, of the intake system, which are accordingly shown in FIG. 1.

Specifically, an input mixture fraction of the component E0—here assigned to the gas mixer 40—is determined "backwards", i.e. by reverse calculation based on the knowledge of the output mixture fraction at the component E4 of the intake path. In the present case, the component E4 corresponds essentially to the engine 10 or to a cylinder Ai, Bi, i=1 . . . 8 of the engine 10. In a first step S1 of the determining method, a cylinder filling is determined with corresponding characteristic values for engine speed nMOT and receiver pressure p5 and receiver temperature T5 via a calculation module in the control unit R4, for example a measure for the required air consumption LAMBDA_a at the engine 10 is indicated. In a second step S2 of the determining method, a mixture mass flow m(')_CYL can be predefined at the component E4 of the intake system—in this case a cylinder inlet for example to a cylinder Ai, Bi, i=1 . . . 8.

Accordingly, FIG. 3 shows a controller structure of a controller 200 which has a first control unit R4 for carrying out steps S1 and S2. The input variables are an engine speed nMOT and a cylinder input pressure—in particular in this case a receiver pressure p5 in a receiver 80 or receiver volume 81.B, 81.A with a total volume V5—and possibly further assigned gas state variables of a mixture fraction in the receiver 80 (with receiver volume V5).

In a third step S3 of FIG. 2, the receiver volumes 81.A, 81.B with a total volume V5 of the receiver 80—for example assigned to a manifold or a mixing path integrated between cylinder inlets and the engine throttle flap DK in the intake path—are then referenced as further component E1 of the intake system.

In the case of the above-mentioned knowledge of the pressure and temperature conditions in the receiver volume 81.A, 81.B, V5 (receiver pressure p5, receiver temperature T5), it is possible in a fourth step S4 to determine a mixture mass flow through the receiver m(')_RECEIVER by means of a control unit R5 shown in FIG. 3. The control unit R5 has a calculation unit which determines the mixture mass flow m(')_RECEIVER from the mixture state of a gas-air mixture in the receiver 80 (also frequently termed receiver tube)—i.e. in the receiver volumes 81.A, 81.B with volume V5 the state parameters p5, T5 of the charge mixture—with a state equation for the charge mixture and a mass flow equation in accordance with the filling and emptying method for the receiver tube 81.A, 81.B.

Furthermore, the preferred embodiment of the determining method in FIG. 2 provides, on the basis of the intake path model, the intercooler 60 for the further component E2. In the assigned volume V3 of the heat exchanger volume 62, the charge mixture adopts a gas state which can be calculated, in a fifth step S5, by means of the charge pressure p3 and the charge temperature T3 for the volume V3. Similarly, a mixture mass flow m(')_LLK through the intercooler 62 is determined according to the determining method represented here. Accordingly, FIG. 3 shows to that end a control unit R3 for determining the mass flow m(')_LLK through the intercooler 60 in the form of the charge air cooler with the cooler structure 61. In a sixth step S6, the determining is performed by means of the filling and emptying method for the volume V3 with the knowledge of the mixing state or of the thermodynamic characteristic values thereof and of a corresponding mixture mass throughflow equation.

It is then possible, in a seventh step S7, by means of the mixture mass flows m(')_CYL, m(')_RECEIVER and m(')_LLK, to identify a setpoint value for a combustion air ratio LAMBDA_setpoint and a stoichiometric air requirement (Lst), i.e. the essential SETPOINT characteristic values of the fuel at the further component E0 of the gas mixer 40 in the intake path 30. To that end, there are provided in the controller structure represented in FIG. 3 a first addition member R45 and a second addition member R43 in order to determine, from a mixture mass throughflow equation, the mixture mass flow m(')_G,SETPOINT; this taking into account a further control unit R0 for carrying out the seventh step S7, namely for calculating the combustion air ratio LAMBDA_SETPOINT and the stoichiometric air requirement Lst.

It is thus possible to predefine, in the eighth step S8, a suitable setting value at the gas mixer 40, in order to set the input mixture fraction at the gas mixer 40 as a function of an actual engine speed nMOT and the pressure and temperature conditions (essentially p5, T5) at the cylinder inlet.

In the present case, the intake path model is configured with two large volumes—namely the receiver volume 81.B, 81.A (V5) and the intercooler volume 62 (V3)—and is introduced into a simulation or calculation of the intake path 30 taking into account the filling/emptying method for both volumes in combination with corresponding throughflow equations for at least the throttles 82, 72 and a compressor model at the compressor 51 (with state variables p1, T1→p2, T2). In the present case, this is sufficient to solve the problems stated in the introduction; the large volumes, which are not sufficiently accounted for in computational methods known hitherto and thus cause an uncoupling of gas mass flow at the gas mixer and the gas mass flow actually present at the motor, are sufficiently accounted for in the intake path model of the determining method represented in FIG. 2. It can simultaneously be seen that the determining method in the form represented here can be carried out relatively simply and thus effectively in terms of calculation time in order to be available in the context of a simultaneous real-time determining. It is thus possible for the gas mixer 40 to be adjusted to the short-term needs of the engine 10 practically in real-time.

In a refinement of the determining method shown in FIG. 2, FIG. 3 shows in detail the control unit R3 and also a feedback for the mass flows m(')_DK, m(')_RECEIVER and m(')_LLK. This makes sense for the case in which a bypass 70 is provided. As shown in FIG. 3, the state variables of the charge mixture G are taken into account as further input variables to the control unit R3 for a mixture state downstream of the compressor 51, namely as compression pressure p2 and compression temperature T2 in addition to the mixture state in or downstream of the intercooler 60, as charge pressure p3 and charge temperature T3. The mixture state downstream of the compressor 51 (state parameters p2, T2) is identified within the context of a further control unit R2 for describing the compressor 51 in a compressor model.

The compressor 51 is accounted for in the intake path model as a further intake path device E3 with a control unit R2 arranged upstream thereof. A mixture mass flow m(')_LLK of the charge air cooler 60 serves as input to the control unit. This is in turn dependent on a mixture mass flow m(')_VBP at the compressor bypass flap 72 and also on the mixture mass flow at an engine throttle flap 82.A, 82.B. In the present case, these mixture mass flows are added in the addition unit R42 in order to give the mixture mass flow m(')_LLK supplied at the inlet of the heat exchanger 60. The mixture mass flow m(')_DK at the engine throttle flap 82.B, 82.A is in turn obtained as the output from the addition member R45, i.e. reverse-calculated from the mixture mass flow m(')_CYL at the cylinder inlet and receiver volume.

The further input of a mixture mass flow m(')_DK returned from the throttle flap DK in feedback to the control unit R2—i.e. the influence of the intake path device C5 for setting the return flow of a charge mixture through the compressor bypass 70—is obtained through the feedback, shown in dashed lines in FIG. 3, of the output of the addition unit R45 to the input of the addition unit R42.

The mixture mass flow through the compressor bypass 70 is in turn obtained in the context of a throughflow equation at the further intake path device C3, namely in this case the compressor bypass flap 72. While the mixture mass flow m(')_DK at the engine throttle flap DK essentially results from the setting αDK of the throttle flap as intake path device C5, the mixture mass flow of the compressor bypass m(')_VBP essentially results from the setting αVBP of the compressor bypass throttle 72 and taking into account the pressure ratios at the beginning and at the end of the compressor bypass 70, namely taking into account p1, T1 (i.e. the charge mixture state upstream of the compressor 51) and p3, T3 (i.e. the charge mixture state upstream of the throttle flap DK).

Thus, the further control unit R1 obtains, as input variables, not only the setting αVBP of the compressor bypass throttle 72 but also the gas state variables p3, T3 in the intercooler 60 and at least the intake pressure p1, T1 upstream of the compressor, wherein the temperature T1 can essentially correspond to the ambient temperature T0.

As a result, it is possible, using the controller structure 200 shown in more detail in FIG. 3, to realize an improved method for operating the gas internal combustion engine 100.

The invention claimed is:

1. A method for operating a gas internal combustion engine having a gas mixer, an intake path and an engine having a number of cylinders, the method comprising the steps of:

supplying the engine with a gaseous fuel mixture comprising a charge mixture and operating the engine in gas operation with gas as fuel in the charge mixture;

determining an output mixture fraction, assigned to a later mixture state, of the fuel gas-air mixture by an input mixture fraction, assigned to at least one earlier mixture state, of a fuel gas-air mixture, wherein the determining takes place by an intake path model serving as a basis for a computational model for the intake path, wherein the output mixture fraction of the fuel gas-air mixture is determined at an engine supply;

determining the input mixture fraction from the output mixture fraction via a number of intermediate states of the mixture fraction in a number of assigned volumes of the intake path in real-time simultaneous with operation of the engine, wherein the input mixture fraction of a fuel gas-air mixture is determined at the gas mixer and an air flow and/or a fuel gas flow at the gas mixer is set as a function of the input mixture fraction.

2. The method as claimed in claim 1, wherein
the input mixture fraction of a gas-air mixture is determined at an outlet of the gas mixer and/or
the output mixture fraction of a gas-air mixture is determined at a cylinder or a cylinder inlet of the engine or a receiver.

3. The method as claimed in claim 1, wherein determining a mixture fraction comprises:
determining a mixture mass flow by a throughflow equation for a volume of the intake path, wherein a mixture mass flow is assigned to the input mixture fraction at the gas mixer and/or a mixture mass flow at an engine supply is assigned to the output mixture fraction;
and/or
determining a mixture state includes at least determining a temperature and/or a state pressure of the mixture fraction for an assigned volume of the intake path by a thermodynamic state equation for real or ideal gases in the assigned volume.

4. The method as claimed in claim 3, wherein the mixture fraction is determined in the assigned volume of the intake path for a number of theoretical computational volumes of the intake path and/or for a number of real housing volumes of the intake path, wherein the number of intermediate states of the mixture fraction in the intake path is assigned to at least one large volume of the intake path.

5. The method as claimed in claim 4, wherein a number of large volumes of the intake path comprises at least one component volume of the intake path chosen from the group consisting of:
at least one receiver volume,
at least one cylinder volume in an engine block,
at least one intercooler volume, and
at least one compressor volume.

6. The method as claimed in claim 1, wherein a combustion air ratio is assigned to the input mixture fraction, wherein a gas metering unit of the gas mixer is controlled by a stoichiometric air requirement and/or by the combustion air ratio.

7. The method as claimed in claim 1, wherein a state pressure is defined as a receiver pressure in a receiver volume upstream of a cylinder of the engine, which is arranged upstream of the cylinder and is arranged downstream of a forced-induction unit and/or of a bypass path.

8. The method as claimed in claim 1, wherein a state pressure is determined virtually based on a computational model of the intake path comprising at least one computational volume of a receiver volume and/or of an intercooler.

9. The method as claimed in claim 1, wherein the number of at least one large volume(s) of the intake path comprises at least one component volume of the intake path chosen from the group consisting of:
at least one compressor bypass volume; and
at least one intake path volume.

10. The method as claimed in claim 9, wherein the compressor bypass volume is at a bypass pipe section and/or a compressor bypass flap, and the intake path volume is at an intake pipe section and/or at an engine throttle flap and/or inlet throttle flap.

11. The method as claimed in claim 1, wherein a mixture mass flow is determined at a throttle, wherein a throughflow of a return flow and/or of a forced-induction flow is determined by a throughflow equation for compressible media at an ideal or real nozzle assuming a flow of ideal or real gases which is frictionless or is subject to friction.

12. The method as claimed in claim 1,
wherein the gas operation is a spark-ignition gas operation.

13. An internal combustion engine designed as a gas internal combustion engine, comprising:
a gas mixer;
a gaseous fuel intake path;
an engine having a number of cylinders and a receiver volume arranged upstream of the cylinders;
a forced-induction unit for the fuel intake path;
a bypass path for the fuel intake path for bypassing the forced-induction unit,
wherein the engine is operable in gas operation with gas as fuel with a supplied fuel mixture comprising a charge mixture; and
a control system configured:
to determine an output mixture fraction, assigned to a later mixture state, of the fuel gas-air mixture by an input mixture fraction, assigned to at least one earlier mixture state, of a fuel gas-air mixture,
to determine the input mixture fraction in the earlier mixture state via the output mixture fraction in the later mixture state by an intake path model serving as a basis for a computational model for the intake path,
to determine the output mixture fraction of the fuel gas-air mixture at an engine supply, and
to determine the input mixture fraction from the mixture state of the output mixture fraction via a number of intermediate states of the mixture fraction, in a number of assigned volumes of the intake path in real-time simultaneous with operation of the engine, wherein
the input mixture fraction of a fuel gas-air mixture is determined at the gas mixer and an air flow and/or a fuel gas flow is set at the gas mixer as a function of the input mixture fraction.

* * * * *